June 4, 1935.  J. B. FORD  2,003,433
AIRCRAFT BODY
Filed July 1, 1932    2 Sheets-Sheet 1
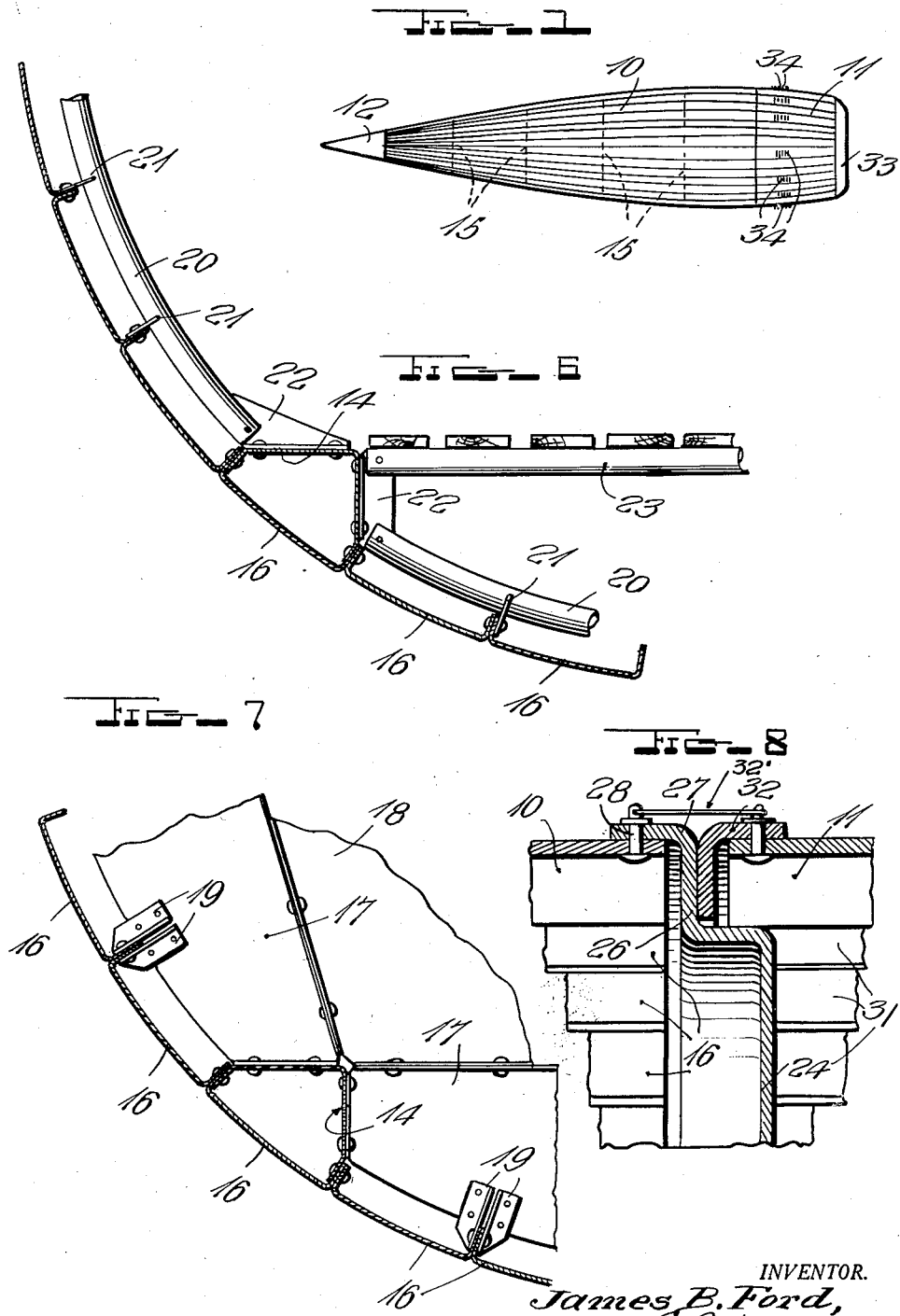
INVENTOR.
James B. Ford,
BY R. J. Whitaker
his ATTORNEY.

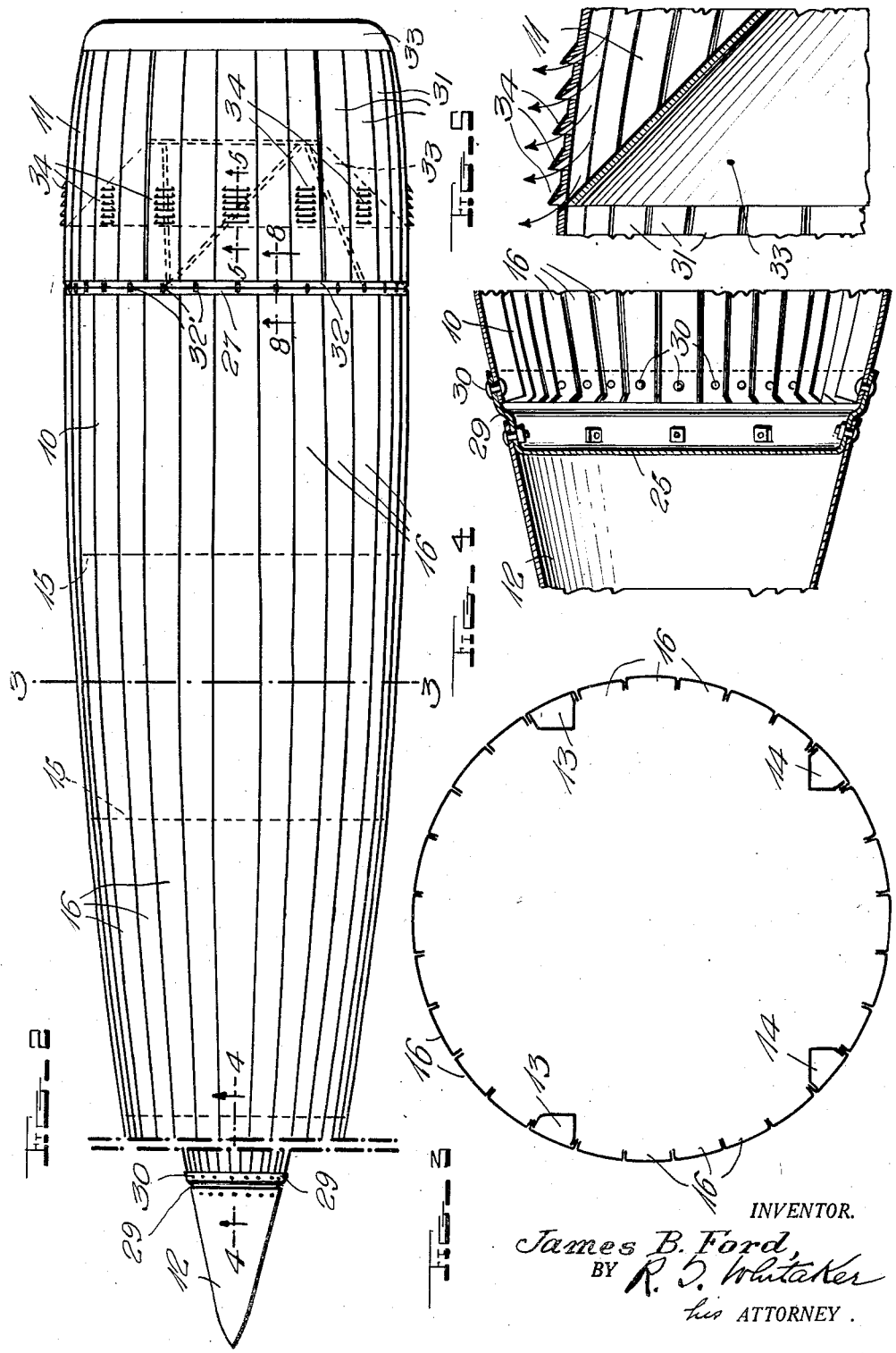

Patented June 4, 1935

2,003,433

UNITED STATES PATENT OFFICE 2,003,433

AIRCRAFT BODY

James B. Ford, Tulsa, Okla.

Application July 1, 1932, Serial No. 620,500

7 Claims. (Cl. 244—30)

This invention relates to aircraft and more particularly to an improved fuselage for an airplane although the construction may be embodied in a flying boat hull, a pontoon, or any portion of aircraft or other craft for which it is found adaptable.

One object of the invention is to provide a fuselage having a shell formed of longitudinally extending shell panels or strips of such construction that while they may be firmly secured to each other and to an inner frame, fasteners for the strips will not project outwardly through the strips and therefore will be concealed from view.

Another object of the invention is to provide a fuselage wherein shell panels and longerons, bulkheads, and end rings will be firmly held in engagement with each other and thereby form a staunch and durable structure capable of sustaining stresses to which it may be subjected.

Another object of the invention is to provide the fuselage with front and rear sections which when in place impart proper streamlining to the fuselage and are so secured that while they will be firmly held in place, may be removed when necessary.

Another object of the invention is to so form the front section that it serves as a cowling for an engine, air being permitted to pass through the front section to cool the engine but fumes or flames being prevented from passing rearwardly into the main body of the fuselage.

Another object of the invention is to provide bulkheads for bracing the fuselage intermediate its length which are secured to both the longerons and gores and serve very effectively to prevent the fuselage from being twisted out of shape, by local concentrated loads in or on the fuselage.

Another object of the invention is to have a portion of the frame within the cockpit or cabin removable and have mounted thereon flooring seats, an instrument board, and controls without securing means for the same extending through the shell and detracting from the appearance of the fuselage.

Another object is to provide a stressed shell type fuselage with an open truss type motor mount detachably connected to it so as to make the engine and its accessories available for inspection and repair when the cowling is removed.

Still another object of the invention is to provide a fuselage of all metal construction which can be easily assembled and when assembled will be of a streamline construction and very strong and durable.

Additional objects and advantages will be apparent from a reading of the following specification, taken in connection with the accompanying sheets of drawings, and outlined in the subjoined claims.

The invention is illustrated in the accompanying drawings wherein:

Figure 1 is a side elevation of the improved fuselage.

Figure 2 is a side elevation upon an enlarged scale.

Figure 3 is a diagrammatic view taken transversely through the fuselage along the line 3—3 of Fig. 2.

Figure 4 is an enlarged fragmentary sectional view taken through the rear portion of the fuselage along the line 4—4 of Figure 2.

Figure 5 is a section taken along the line 5—5 of Figure 2.

Figure 6 is a fragmentary sectional view illustrating the means for supporting flooring and other mechanism within a cockpit of the fuselage.

Figure 7 is a fragmentary sectional view illustrating the manner in which bulkheads forming a part of the frame are constructed and mounted, and Figure 8 is a fragmentary sectional view taken along the line 8—8 of Figure 2.

This improved fuselage is formed of metal in order that it will be fireproof and while light in weight, very strong. It tapers rearwardly and has a main body 10 and front and rear sections 11 and 12. Referring to Figs. 1 and 2 it will be seen that the body and front section each has a shell formed of longitudinally extending panels or strips whereas the rear section consists of a cone formed of sheetmetal. While the fuselage has been shown circular in cross section it will be understood that it may be of any shape desired.

The main section 10 has an inner frame to which the shell panels are secured and this frame consists of upper and lower longerons 13 and 14 secured to a suitable number of bulkheads or open frames 15 and spaced from each other longitudinally of the body. The panels or strips 16 and the longerons are formed of metal channels and referring to Fig. 3 it will be seen that side flanges of the panels extend inwardly while the longerons are substantially trough shaped and have their side flanges facing outwardly. Rivets firmly hold flanges of the panels in face to face engagement with each other and since certain of the panels straddle the longerons, rivets passed through their flanges can also engage through flanges of the longerons and firmly secure these panels to the longerons. Each bulkhead consists of a suitable number of arcuate sections 17 of sheet metal disposed about a center plate or section 18 to which they are secured by rivets passed through contacting side flanges and referring to Figure 7 it will be seen that the sections 17 have flanges at their ends secured in flat contacting engagement with the longerons by rivets or other suitable fasteners.

These sections 17 are also provided with radially extending cleats 19 which project outwardly and are riveted against opposite side faces of the inwardly extending side flanges of the shell panels. Any number of cleats desired may be provided. By employing the construction set forth above there will be provided a body having a strong frame to which longitudinally extending shell panels or strips are secured to form a shell and since all of the rivets are within the body the shell will have a substantially smooth outer surface.

At a suitable point intermediate the length of the body a cockpit or cabin is to be formed between bulkheads and in between the front and rear ends of the cockpit will be located rings each formed of arcuate tube sections 20 carrying cleats 21 secured to flanges of the shell panels and having their ends riveted to brackets 22 attached to the longerons. Tubes 23, serving as cross bars, extend transversely in the lower portion of the cockpit with their ends secured to certain of the brackets 22 and these tubes carry floor boards and seats (not shown). The rings together with the cross bars will also serve as supporting means for a steering column, control pedals, instrument board and engine controls. These elements have not been illustrated as they are the usual equipment of an airplane. The rings may also serve as supports for door and window frames.

Front and rear ends of the body 10 are closed by heads 24 and 25 formed of strong sheet metal, the head 24 being shaped to provide means for detachably connecting the front section 11 and having a rim 26 carrying a rearwardly projecting annular flange 27 which encircles forward ends of the panels 16 and is firmly secured to the same by rivets 28. The head 25 closing the rear end of the body has a forwardly projecting marginal rim or flange 29 encircling the rear end of the body and secured to the shell panels by rivets 30 and the rim of this head is recessed as shown in Figure 4 in order that it may fit within and provide means for detachably connecting the conical rear section or tail piece 12.

The front section 11 serves as an engine cowl and this section comprises panels 31 formed of metal channels similar to that from which the panels 16 are formed. These panels have their ends riveted or otherwise firmly secured to rings 32 and are detachably connected to ring 33. Referring to Figure 8 it will be seen that the ring 32 rests against the rim 26 of the head 24, and is detachably connected thereto by any suitable type of cowling fastener or automobile body latch, as shown conventionally at 32' which is accessible from outside the fuselage. Therefore the front section will be firmly secured at the front of the body but it can be removed when necessary. A section of the cowl may be left free from the rings and hingedly mounted in order that it may be lifted and an engine within the cowl inspected. A suitable supporting frame for an engine of the radial type is mounted within the cowl as indicated by dotted lines in Figure 2 and about the engine support is disposed a frustro conical deflector 33 formed of sheet metal and bearing againt the walls of the cowl back of the louvers 34. By this arrangement, air entering the cowl through its front end and serving to cool the engine, will be guided rearwardly towards the sides of the cowl and out through the discharge openings of the louvers. Therefore a very good draft of air will be provided for an air cooled motor. If the engine is water cooled, a radiator of a conventional construction may be mounted in the front ring and air pass through the same into the cowl and out through the louvers.

I have therefore provided a fuselage which is of an all metal construction and will be very strong and at the same time of light weight. I have further provided a fuselage having a main section and companion front and rear sections, the front section, not only completing the fuselage, but also serving as an engine cowl in which the engine will be mounted.

Although I have herein described a single complete embodiment of my invention in metal construction suggesting various alternative details, it should be understood that numerous modifications and other materials might easily be used by workers skilled in the art to which this case relates, without departing from the spirit of the invention.

What I claim as new and desire to secure by Letters Patent of the United States is:

1. An aircraft fuselage comprising a body having a shell of longitudinally extending panels having inturned side flanges secured against each other, heads for ends of said body having marginal flanges secured against the panels, and front and rear sections for the fuselage aligned with the body and secured against said heads, the front section being open at its front end to admit air and walls of the front section having discharge openings formed therein for escape of air, and an annular deflector in said front section bearing against its walls back of the discharge openings and serving to direct air towards the same.

2. In an aircraft fuselage, a body comprising longitudinally extending longerons spaced from each other circumferentially of the body, bulkheads spaced from each other longitudinally of the body and secured to longerons, the longerons being formed of channel sections and having their side flanges facing outwardly and the bulkheads each consisting of a center section, circumferentially extending marginal sections, said sections having marginal flanges secured to each other and the marginal sections having end flanges secured against said longerons, and a shell about said frame formed of longitudinally extending panels of channel section having inwardly projecting side flanges secured in face to face engagement with each other, certain of said panels straddling the longerons and having their side flanges secured against the marginal sections of the bulkheads and projecting radially therefrom in straddling relation to side flanges of the panels and secured against side faces thereof.

3. An aircraft fuselage constructed in accordance with claim 2 and having a motor mount of the open truss type united to the front end of the body by fastening means which embrace directly the front bulkhead and adjacent the ends of the longerons, and thus indirectly the shell of the barrel.

4. In an aircraft body of the type described in claim 1, an engine cowl which is a detachable extension of the body barrel and supported at its rear end by the front head of the body, and a cowling ring for the front end of the engine cowl bracing the front portion of the engine cowl and forming an entering edge for the fuselage.

5. An aircraft body of the type set forth in claim 1 having a front section extending forwardly from the front head a sufficient distance to completely enclose an engine having a support at its back connected with the front head, said front section being open at its front end provided with outlet louvers in its walls spaced slightly from its rear end and also having internal deflectors to guide cooling air outwardly through the louvers after passing an engine.

6. An aircraft body comprising a main central part, a detachable forward extension and a detachable rearward extension, said central part being a shell comprising longitudinally extending shell panels united to each other and also internal longerons extending longitudinally of the body and united to the shell panels with internal tubular ribs extending circumferentially of the body, said ribs being united to the longerons and to the shell panels and within the body sub-framings united to the longerons and the ribs, said sub-framings being disposed so as to support the concentrated loads on or within the body and distribute the stresses imposed by said loads to the longerons and ribs and thence to the body shell.

7. In an aircraft fuselage, a body having a shell consisting of longitudinally extending panels having side flanges secured in face to face engagement with each other, heads fitting the front and rear ends of said body, each head having marginal portions secured to the ends of the panels, said assembly forming an integral stress bearing unit, and front and rear cowling sections for the fuselage alined with the body, and fasteners detachably connecting the cowling sections to the body without transmitting body stresses to the cowling sections, the front cowling section forming an engine enclosure and cooling duct and being formed with front openings for entrance of air and side openings for exit of air.

JAMES B. FORD.